(12) United States Patent
Grcevski et al.

(10) Patent No.: US 7,908,256 B2
(45) Date of Patent: Mar. 15, 2011

(54) SPECULATIVE COMPUTATION LOCK COARSENING THROUGH THE USE OF LOCALIZED LOCK RESERVATION

(75) Inventors: Nikola Grcevski, Toronto (CA); Peter Burka, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 11/948,154

(22) Filed: Nov. 30, 2007

(65) Prior Publication Data
US 2009/0144281 A1      Jun. 4, 2009

(51) Int. Cl.
*G06F 17/30* (2006.01)
*G06F 7/00* (2006.01)

(52) U.S. Cl. ......................... 707/704; 717/160
(58) Field of Classification Search .................. None
See application file for complete search history.

(56) References Cited

U.S. PATENT DOCUMENTS

| | | | | |
|---|---|---|---|---|
| 5,303,368 A * | 4/1994 | Kotaki | 707/999.008 |
| 6,487,652 B1 * | 11/2002 | Gomes et al. | 712/23 |
| 6,530,079 B1 * | 3/2003 | Choi et al. | 717/158 |
| 7,404,183 B2 * | 7/2008 | Grcevski et al. | 717/160 |
| 7,552,428 B2 * | 6/2009 | Stoodley et al. | 717/148 |
| 2004/0250240 A1 * | 12/2004 | Stoodley et al. | 717/116 |
| 2005/0081185 A1 * | 4/2005 | Stoodley et al. | 717/100 |
| 2005/0289549 A1 * | 12/2005 | Cierniak et al. | 718/102 |
| 2008/0250396 A1 * | 10/2008 | Grcevski et al. | 717/124 |
| 2009/0064094 A1 * | 3/2009 | Burka et al. | 717/106 |
| 2009/0235240 A1 * | 9/2009 | Stoodley et al. | 717/148 |

OTHER PUBLICATIONS

Diniz, P. and M. Rinard "Lock Coarsening: Eliminating Lock Overhead in Automatically Parallelized Object-Based Programs", in Languages and Computers for Parallel Computing, LNCS vol. 1239, 1997, pp. 285-299.*

Diniz, P.C. and M.C. Rinard "Eliminating Synchronization Overhead in Automatically Parallelized Programs Using Dynamic Feedback", ACM Transactions on Computer Systems, vol. 17, No. 2, May 1999, pp. 89-132.*

Kawachiya, K., A. Koseki and T. Onodera "Lock Reservation: Java™ Locks Can Mostly Do Without Atomic Operations", Proceedings of the International Conference on Object Oriented Programming Systems, Languages and Applications (OOPSLA), Nov. 4-8, 2002, pp. 130-141.*

Zeng, F. and R.P. Martin "Ghost Locks: Deadlock Prevention for Java™", Proceedings of the Mid-Atlantic Student Workshop on Programming Languages and Systems (MASPLAS), Apr. 3, 2004, pp. 11.1-11.6.*

Grcevski, N., A. Kielstra, K. Stoodley and V. Sundaresan "Java™ Just-In-Time Compiler and Virtual Machine Improvements for Server and Middleware Applications", Proceedings of the 3rd Virtual Machine Research and Technology Symposium, May 6-7, 2004.*

(Continued)

*Primary Examiner* — Luke S Wassum
(74) *Attorney, Agent, or Firm* — David Mims; Mark P Kahler

(57) ABSTRACT

A computer-implementable method, system and computer-usable medium. One or more objects among a plurality of objects can be processed utilizing a data-processing apparatus/system. One or more lock reservations can be applied among a group of lock reservations over a multiple sequential lock operations with respect the particular object. Thereafter, the lock reservation can be cancelled with respect to the last monitor exit operation in order to eliminate lock operations where traditional lock coarsening cannot be applied.

9 Claims, 6 Drawing Sheets

OTHER PUBLICATIONS

Ogasawara, T., H. Komatsu and T. Nakatani "TO_Lock: Removing Lock Overhead Using the Owners' Temporal Locality", Proceedings of the 13th International Conference on Parallel Architecture and Compilation Techniques (PACT), Sep. 29-30, 2004.*

Ogasawara, T., H. Komatsu and T. Nakatani "Efficient Lock Algorithm for Shared Objects in SMP Environments", Information and Media Technologies, vol. 2, No. 1, Information Processing Society of Japan, 2007, pp. 154-162.*

Harris, T. and K. Fraser "Revocable Locks for Non-Blocking Programming", Proceedings of the ACM SIGPLAN Symposium on Principles and Practice of Parallel Programming (PPoPP), Jun. 15-17, 2005, pp. 72-82.*

Goetz, B. "Java™ Theory and Practice: Synchronization Optimizations in Mustang", downloaded from www.ibm.com/developerworks/java/library/j-jtp10185/index.html, Oct. 18, 2005.*

Harris, T., M. Plesko, A. Shinnar and D. Tarditi "Optimizing Memory Transactions", Proceedings of the ACM SIGPLAN Conference on Programming Language Design and Implementation (PLDI), Jun. 11-14, 2006.*

Grcevski, N. "Effective Method for Java™ Lock Reservation for Java Virtual Machines that Have Cooperative Multithreading", Slide Presentation, Proceedings of the 6th Workshop on Compiler-Driven Performance, Oct. 22, 2007.*

Lucia, B., J. Devietti, T. Bergan, L. Ceze and D. Grossman "Lock Prediction", Proceedings of the 2nd USENIX Workshop on Hot Topics in Parallelism, Jun. 2010.*

K. Kawachiya, A. Koseki, and T. Onodera: "Lock Reservation: Java Locks Can Mostly Do Without Atomic Operations". Proceedings of ACM OOPSLA 2002, IBM Research, Tokyo Research Laboratory.

Tamiya Onodera, Kiyokuni Kawachiya, Akira Koseki: "Lock Reservation for Java Reconsidered", European Conference on Object Oriented Programming (ECOOP2004), pp. 560-584, 2004.

Kenneth Russell, David Detlefs: "Eliminating Synchronization-Related Atomic Operations with Biased Locking and Bulk Rebiasing". OOPSLA?06, Portland, Oregon, Oct. 22-26, 2006.

D. F. Bacon, R. Konuru, C. Murthy, and M. Serrano: "Thin Locks: Featherweight Synchronization for Java". Proceedings of ACM PLDI, 1998, IBM T.J. Watson Research Center.

* cited by examiner

```
Reserve primitive:                                              500
    if (object.lock = NIL)
        locked object.lock = ThreadID + Reservation bit Unreserve primitive:
    if (object.reserved = TRUE and object.reservationThread = current thread and
    object.reservationCount = NIL)
        object.lock = NIL
```

FIG. 5

SPECULATIVE COMPUTATION LOCK COARSENING THROUGH THE USE OF LOCALIZED LOCK RESERVATION

TECHNICAL FIELD

Embodiments are generally related to data-processing systems and methods. Embodiments also relate in general to the field of computers and similar technologies, and in particular to software utilized in this field. In addition, embodiments relate to techniques and systems for implementing lock coarsening.

BACKGROUND OF THE INVENTION

Lock reservation is a technique used by run-time systems (e.g., a Java virtual machine) to reduce the overhead associated with thread object access synchronization (also referred to as locking). (Java is a trademark of Oracle Corp.) Lock reservation assumes that most locks do not actually participate in inter-thread activities and can thus be ignored. One example of a prior art lock reservation technique is disclosed in U.S. Patent Application Publication No. US2005/0289549A1, entitled "Lock Reservation Methods and Apparatus for Multi-Threaded Environments" by Cierniak et al, which published on Dec. 29, 2005, and is incorporated by reference herein.

Lock reservation is extremely effective for applications which have little or no actual thread interaction (i.e., referred to hereafter as "lock contention"). Lock reservation, however, may introduce significant additional performance overhead if reservation is used in cases where contention does occur. Therefore, it is very important to select appropriate situations in which to apply lock reservation, which also means that lock reservation may not be applicable in all cases.

Several solutions have been used or proposed to enhance the effectiveness of lock reservation. First, lock reservation may be enabled globally through the use of a command line option or other configuration flag. This solution places the onus of the decision upon the end user and is therefore undesirable. Second, lock reservation may be enabled for objects, which are instances of particular classes. This requires an effective heuristic for choosing such classes and assumes that instances of the class have similar locking characteristics.

Third, lock reservation may be adaptively enabled for objects or classes of objects within the system. This requires that statistics be gathered during the execution and incurs a certain start up cost as the runtime system learns the characteristics of the application. It also assumes that an object's locking characteristics do not change throughout its lifetime. Fourth, the objects reserved by one thread are reassigned to be owned by a new thread that is locking an object, using bulk object re-biasing. Such a technique, however, assumes that the threads use the objects in certain manner, that is, all objects reserved by one thread will be handed over to another thread. In general, applications may not behave this way and bulk re-biasing will happen all the time, impeding application performance.

Lock coarsening is a technique which is used by compilers (especially Java just-in-time compilers) to combine adjacent mutual exclusion regions (lock regions), usually performing thread synchronization on the same object. Lock coarsening reduces the number of locking operations which must be performed by identifying and removing redundant lock operations. The lock removal is based on static compiler analysis, where the lock region is extended replacing shorter adjacent locked regions. This way the number of lock and unlock operations is reduced, leading to better performance.

Lock coarsening, however, has a limited scope of applicability. There are a number of restrictions that are imposed on the lock optimization procedure, such as not being able to coarsen across other locks. For example, coarsening across region of code that locks another object may result in a deadlock situation where one didn't exist before. This restriction makes it difficult to apply lock coarsening across calls and potential exception points.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for an improved method, system and computer-usable medium for lock coarsening.

It is an additional aspect of the present invention to provide for an improved method, system and computer-usable medium for speculative computation lock coarsening through the use of a localized lock reservation.

The aforementioned aspects and other objectives and advantages can now be achieved as described herein. A computer-implementable method, system and program product is disclosed herein. One or more objects among a plurality of objects can be processed utilizing a data-processing apparatus/system. One or more lock reservations can be applied among a group of lock reservations over multiple sequential lock operations with respect to the particular object. Thereafter, the lock reservation can be cancelled with respect to the last monitor exit operation in order to eliminate lock operations where traditional lock coarsening cannot be applied.

Thus, the disclosed embodiments involve applying a lock reservation(s) over multiple sequential lock operations on the same object and cancelling the reservation on the last monitor exit operation. This is the scenario where one would traditionally apply lock coarsening, but because a lock reservation cannot introduce deadlock situations, lock operations can be eliminated where traditional lock coarsening cannot be applied. Essentially, data processing operations can be implemented in which operations are performed to speculate that the use of the object will be exclusive for a given thread for the duration of the current code region being optimized. The object on the first lock operation is reserved and then unreserved with respect to the last lock operation. In case another thread "needs" this object in the meantime, a deadlock situation can be avoided since the lock reservation is cancelled. Note that in traditional lock reservation implementations a reservation will never be voluntarily released; this is a unique and novel property of the embodiments disclosed herein.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 5 illustrates example software code, which can be implemented in accordance with a preferred embodiment.

DETAILED DESCRIPTION

The particular values and configurations discussed in these non-limiting examples can be varied and are cited merely to illustrate at least one embodiment and are not intended to limit the scope of such embodiments.

Figure 1:
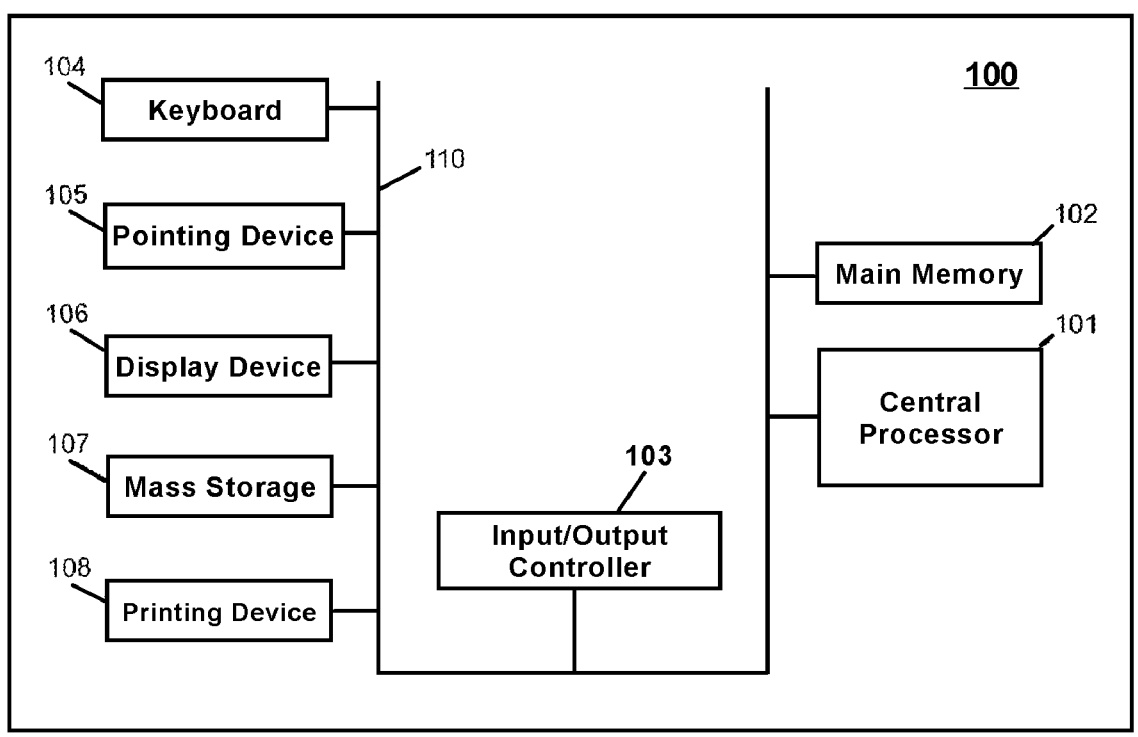
FIG. 1 illustrates a schematic view of a computer system in which the present invention may be embodied.

As shown in FIG. 1, the present invention may be embodied on a data-processing system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the data-processing system 100 as desired. As illustrated, the various components of the data-processing system 100 communicate through a system bus 110 or similar architecture.

Figure 2:
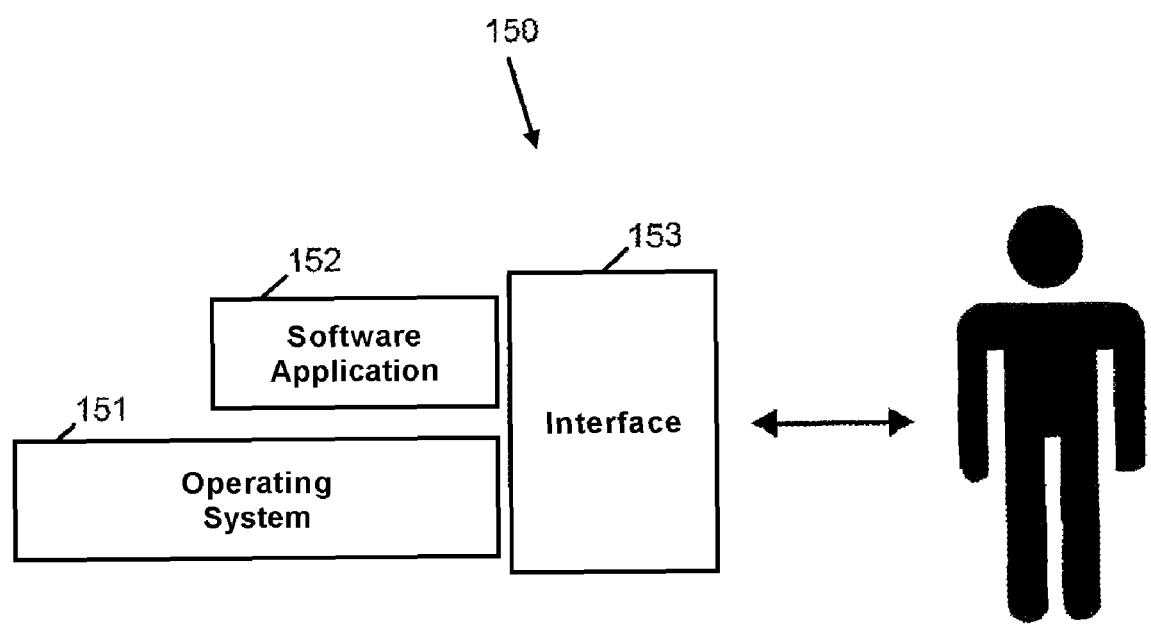
FIG. 2 illustrates a schematic view of a software system including an operating system, application software, and a user interface for carrying out the present invention.

Illustrated in FIG. 2, a computer software system 150 is provided for directing the operation of the data-processing system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing system 100. The data-processing system 100 receives user commands and data through user interface 153; these inputs may then be acted upon by the data-processing system 100 in accordance with instructions from operating system 151 and/or application module 152. The interface 153, which is preferably a graphical user interface (GUI), also serves to display results, whereupon the user may supply additional inputs or terminate the session. In an embodiment, operating system 151 and interface 153 can be implemented in the context of a "Windows" system. Application module 152, on the other hand, can include instructions, such as the various operations described herein with respect to respective methods 300, 500, and 600 of FIGS. 3, 5, and 6.

The following description is presented with respect to embodiments of the present invention, which can be embodied in the context of a data-processing system such as data-processing system 100 and computer software system 150 depicted in FIGS. 1-2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments which follows is for purposes of illustration and not considered a limitation.

FIGS. 3-6 illustrate generally a methodology of object profiling and management and lock coarsening, in accordance with a preferred embodiment. For example, the combination of method 300, 400 and the code 500 depicted respectively in FIGS. 3-5 herein, can be implemented in the context of a computer-useable medium that contains a program product. The method 600 depicted in FIG. 6 can also be implemented in a computer-usable medium containing a program product.

Programs defining functions on the present invention can be delivered to a data storage system or a computer system via a variety of media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet and like network systems. Further, it is understood that the present invention may be implemented by a system having means in the form of hardware, software, or a combination of software and hardware as described herein or their equivalent. Thus, the methodology described herein can be deployed as process software in the context of a computer system or data-processing system as that depicted in FIGS. 1-2.

The disclosed embodiments generally describe how lock reservation can be utilized for applying lock coarsening. Such a technique may be used alone or in conjunction with one or more of the techniques described in the background section of this disclosure. Essentially, lock reservation eliminates the need of performing synchronizing instructions at the point of monitor enter and monitor exit operations, by marking the object as reserved for the current thread executing the mutually exclusive code region. The downside of the approach is that the object will remain marked as reserved and cancelling the reservation can be costly, outweighing the benefit of skipping the synchronizing instructions.

If the thread reserving the object voluntarily removes the reservation, however, then one can avoid the cost associated with cancelling the lock reservation. The disclosed embodiments thus describe the application of a lock reservation over multiple sequential lock operations on the same object and cancellation of the reservation on the last monitor exit operation. This is the scenario where one would traditionally apply lock coarsening, but since lock reservation cannot introduce deadlock situations, lock operations can be eliminated where traditional lock coarsening cannot be applied. Essentially, the disclosed methodology speculates that the use of the object will be exclusive for a given thread for the duration of the current code region that is being optimized. We reserve the object on the first lock operation and unreserve the object on the last lock operation. In case another thread desires this object in meantime, a deadlock situation can be avoided because the lock reservation is cancelled. Note that in traditional lock reservation implementations, a reservation is not voluntarily released, which is a unique and novel feature of the disclosed embodiments.

Figure 3:
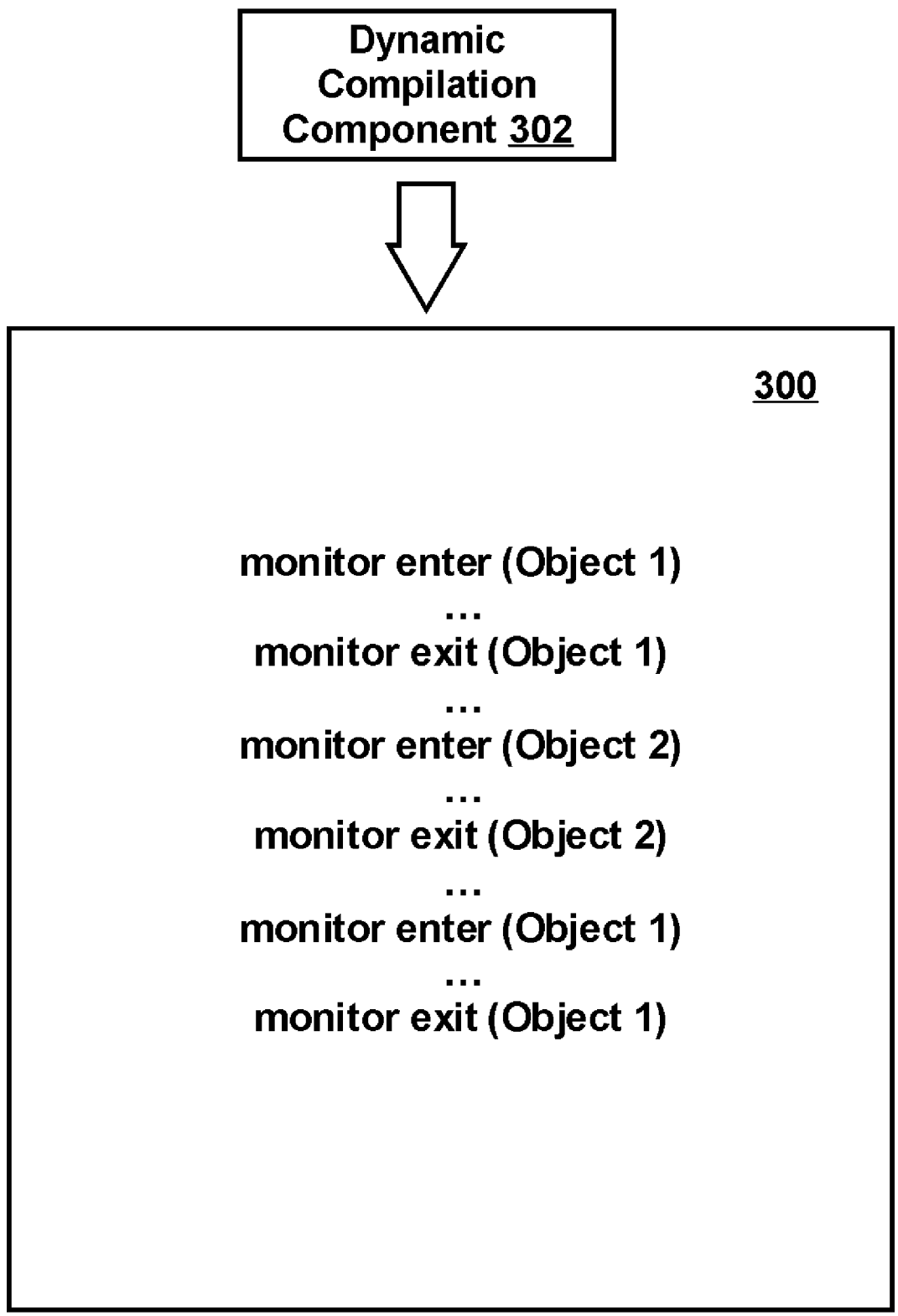
FIG. 3 illustrates a flow diagram of depicting an exemplary method, in accordance with a preferred embodiment.

For example, consider the code region with lock operations as depicted in the flow diagram illustrated in FIG. 3, which represents an example lock reservation method 300 in accordance with a preferred embodiment. Lock coarsening cannot safely optimize the depicted code fragment because of potential deadlock scenario. However if the first monitor enter operation on Object 1 reserved the object for the current thread, then the second monitor enter on Object 1 will avoid all synchronizing instructions and Object 1 would be unreserved on the second monitor exit. This is generally indicated by the flow diagram of method 300 depicted in FIG. 3.

FIG. 3 indicates that the time required to enter a reserved region is approximately the same as the time required to enter a synchronized region. The time required, however, to enter a synchronized region within a reserved region is significantly less; on most computer systems it is, in fact, insignificant in comparison. Thus in the example method 300 depicted in FIG. 3, the cost to enter two synchronized regions (on Object 1) is replaced by the cost to enter one reserved region (i.e. it is half as expensive).

Figure 4:
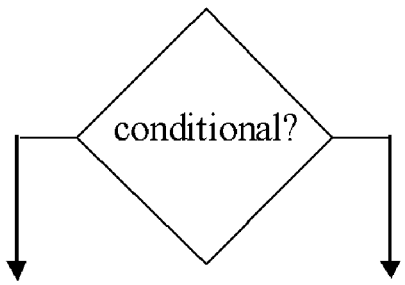
FIG. 4 illustrates a flow diagram of an additional method, which can be implemented in accordance with a preferred embodiment.

Note that the implementation of the optimization procedure preferably utilizes a dynamic compilation component 302, such as a Just-In-Time (JIT) compiler, in association with a methodology, such as, for example, method 300 depicted in FIG. 3, and likewise method 400 depicted in FIG. 4 and the example code 500 illustrated in FIG. 5. Such a compiler 302 generally includes an optimizing component and can perform value propagation and control flow analysis while additionally being able to identify that two or more references to an object in a code sequence are identical or different. The code sequence that the compiler optimizes can be a method, function or an execution trace.

Such a JIT optimizing compiler can perform a monitor identification phase where it detects multiple monitor operations on the same object in a given code region. The identification phase creates a list of candidates for speculative reservation, where a candidate is considered an object which is locked more than once on a given path in the code region. Using control flow analysis the compiler identifies the first monitor-enter and the last monitor-exit operation for a candidate on all code paths. The first monitor-enter and the last monitor-exit operations are tagged as such.

During code generation for monitor-enter and monitor-exit operations, the compiler checks the identification flag and generates reserving monitor operation on each first monitor-enter and unreserving code sequence for every last monitor-exit operation.

Such a transformation can be further illustrated by the example flow chart of method 400 depicted in FIG. 4, in accordance with a preferred embodiment. In method 400 illustrated in FIG. 4 operations [1]-[7] are illustrated, where two monitor operations are implemented with respect to Object_1 and one monitor operation with respect to Object_2. The marking " . . . " as depicted by method 400 in FIG. 4 indicates any other possible code sequence that might occur in between the monitor operations. Given the flow diagram of method 400 depicted if FIG. 4, it can be appreciated that the compiler identification phase will identify that Object 1 as a candidate for transformation because there is more than one lock operation on in the code region. Object 2 on the other hand will not be identified as a candidate. The identification phase will tag monitor-enter operation [1] as reserving and monitor-exit operations [6] and [7] as un-reserving The concept of speculative lock coarsening is based on the fact that multiple lock operations are exposed in a single code region (i.e., method, function or trace) optimization body. The ability to expose multiple lock operations on an object in a single code region would be limited by the effectiveness of the in-lining optimization, performed by the compiler. For example, instead of having locked operation in a particular code region, one could "call" a synchronized method/function on an object, which in turn can effectively introduce a lock operation on the object.

To increase the effectiveness of the speculative lock coarsening operation, the disclosed embodiments extend the scope of the optimization to handle synchronized method/function calls, and treat these as synchronization points for the optimization. Essentially, one can enable the optimization if multiple lock operations are exposed in a particular code region or synchronized calls are made in the code region.

Handling of synchronized calls for the purpose of speculative lock reservation is different than synchronized lock operations. The main difference is that the disclosed embodiments do not tag the monitor-enter/monitor-exit primitives for a call to a reservation as one can with respect to a synchronized lock operation. The synchronized lock operations can be provided as "private" to the disclosed method body, while a synchronized call has global implications. A synchronized method can be made from more than one calling context, where in some contexts it may not be desirable to reserve the object. Therefore, tagging of the lock operations for a synchronized method is undesirable.

To resolve this issue, two separate locking primitives can be introduced, that is "reserve object" and "unreserve object". The reserve locking primitive can be introduced before making a synchronized call on an object that is locked in the context of the current code region. One only needs to introduce the reserve primitive if the synchronized call is a first lock operation on the object in the current code context. The unreserve primitive is introduced after making the synchronized call to a method/function and the synchronized call is the last lock operation of the object in the current code region context.

The semantics of the reserve and unreserve primitives are depicted in the example code 500 illustrated in FIG. 5. It can be appreciated that the code 500 depicted in FIG. 5 represents merely an example of software code that can be implemented in accordance with one particular embodiment and that numerous other types of code can be implemented in accordance with other embodiments. The code 500 of FIG. 5 is thus provided herein for exemplary purposes only and is not considered a limiting feature of the embodiments disclosed herein.

The reserve primitive can utilize a lock operation to reserve the object if the lock is in an "unowned" state. There is no side-effect if the lock operation fails because another thread has modified the object lock state, after a determination is made that the lock was unowned. In case one fails to take the lock, the current execution thread will simply continue to the synchronized call and use normal lock semantics. The unreserve lock operation does not require a lock operation, because the object is reserved and the lock state cannot be changed by another thread, unless the reserving thread has stopped. One may not stop the reserving thread at random locations but at well defined async points, which permits avoidance of using lock operations for the unreserve primitive.

Figure 6:
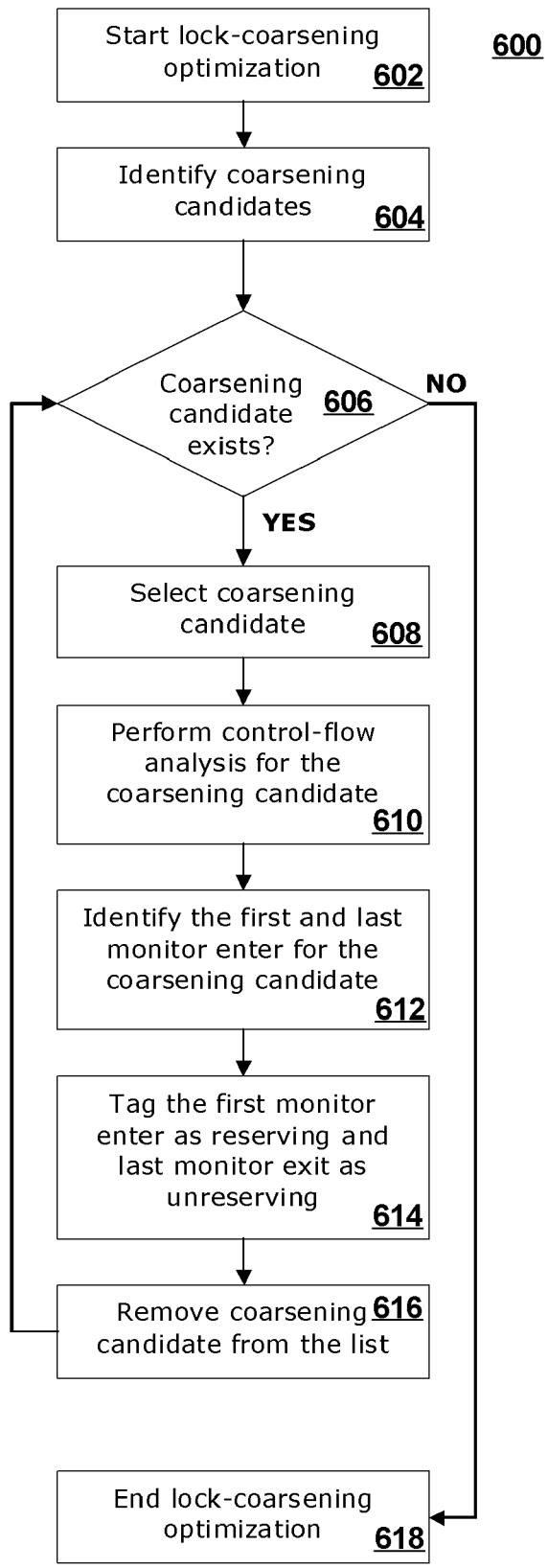
FIG. 6 illustrates a general flow-chart of operations depicting a lock-coarsening method, which can be implemented in accordance with an alternative embodiment.

FIG. 6 illustrates a general flow-chart of operations depicting a lock-coarsening method 600, which can be implemented in accordance with an alternative embodiment. As depicted at block 602, an operation can be initiated to begin a lock-coarsening optimization. Next, as illustrated at block 604, coarsening candidates can be identified. Thereafter, as described at block 606, a test can be performed to determine if coarsening candidates exist. If it is determined that coarsening candidates do not exist, then the operation illustrated at block 618 is processed in which the lock-coarsening optimization procedure is terminated. If, however, it is determined that coarsening candidates do in fact exist, then one or more coarsening candidates can actually be selected, as depicted at block 608.

Thereafter, as indicated at block 610, an operation can be implemented to perform a control-flow analysis for the coarsening candidate or candidates. Next, as illustrated at block 612, the first and last monitor enter can be identified with respect to the coarsening candidate(s). Thereafter, as indicated at block 614, an operation can be processed to tag the first monitor enter as "reserving" and the last monitor exit as "unreserving". Finally, an operation can be implemented as described at block 616 to remove the coarsening candidate(s) from the list. The operation depicted at block 606 can then be implemented followed by a repetition of the operations described at blocks 608 to 614.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method, comprising:
    loading, by a data processing system, a current code region and a particular object among a plurality of objects;
    optimizing, by the data processing system, the current code region, wherein the optimizing includes:
        speculating, by the data processing system, that a use of the particular object is exclusive with respect to a particular thread of the current code region for the duration of the current code region being optimized;
        applying, by the data processing system, a lock reservation over a plurality of sequential lock operations to the particular object; and
        thereafter voluntarily cancelling, by the data processing system, the lock reservation with respect to a last monitor exit operation of the plurality of sequential lock operations in order to avoid deadlock.

2. The method of claim 1 wherein the applying step and the thereafter voluntarily cancelling step are performed by a dynamic compilation component.

3. The method of claim 2 wherein the dynamic compilation component comprises a JIT (Just-in-Time) Compiler.

4. A system, comprising:
    a processor;
    a data bus coupled to the processor; and
    a computer-usable medium embodying computer code, the computer-usable medium being coupled to the data bus, the computer program code comprising instructions executable by the processor and configured for:
        loading a current code region and a particular object among a plurality of objects;
        optimizing the current code region, wherein the optimizing includes:
            speculating, by the data processing system, that a use of the particular object is exclusive with respect to a particular thread of the current code region for the duration of the current code region being optimized;
            applying a lock reservation over a plurality of sequential lock operations to the particular object; and
            thereafter voluntarily cancelling the lock reservation with respect to a last monitor exit operation of the plurality of sequential lock operations in order to avoid deadlock.

5. The system of claim 4 wherein the computer-usable medium further comprises a dynamic compilation component that performs the loading of the particular object and the applying the lock reservation over the plurality of sequential lock operations.

6. The system of claim 5 wherein the dynamic compilation component comprises a JIT (Just-in-Time) Compiler.

7. A computer-usable non-transitory medium embodying computer program code, the computer program code comprising computer executable instructions configured for:
    loading a current code region and a particular object among a plurality of objects;
    optimizing, by the data processing system, the current code region, wherein the optimizing includes:
        speculating, by the data processing system, that a use of the particular object is exclusive with respect to a particular thread of the current code region for the duration of the current code region being optimized;
        applying a lock reservation over a plurality of sequential lock operations to the particular object; and
        thereafter voluntarily cancelling the lock reservation with respect to a last monitor exit operation of the plurality of sequential lock operations in order to avoid deadlock.

8. The computer-usable non-transitory medium of claim 7 wherein the applying the lock reservation and the thereafter voluntarily cancelling the lock reservation are performed by a dynamic compilation component.

9. The computer-usable non-transitory medium of claim 8, wherein the dynamic compilation component comprises a JIT (Just-in-Time) Compiler.

* * * * *